Figure 2A:
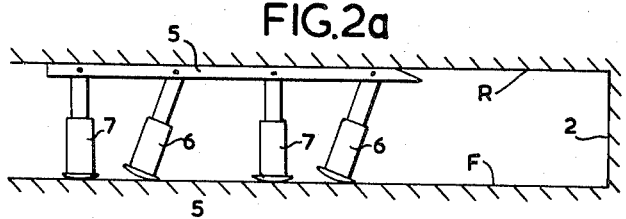

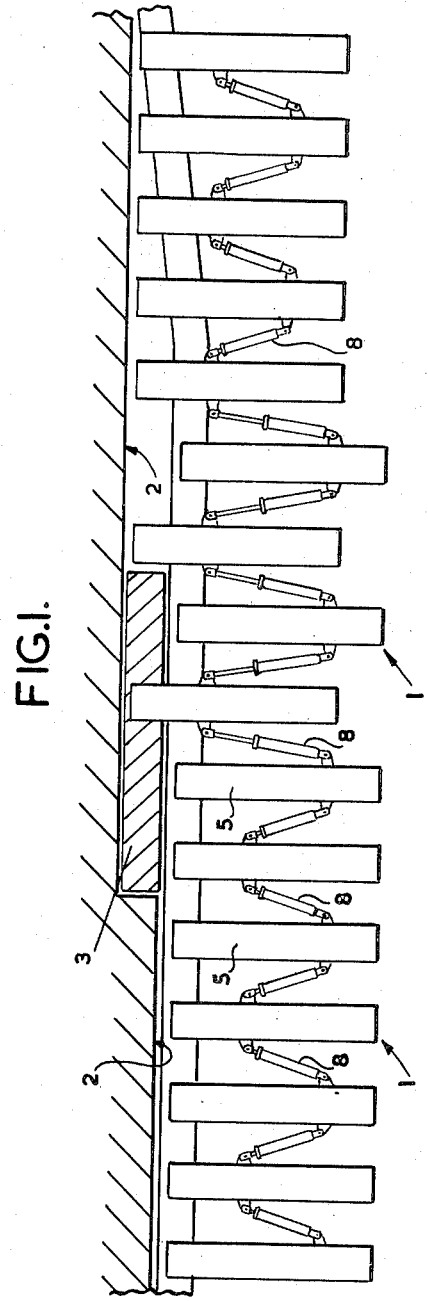

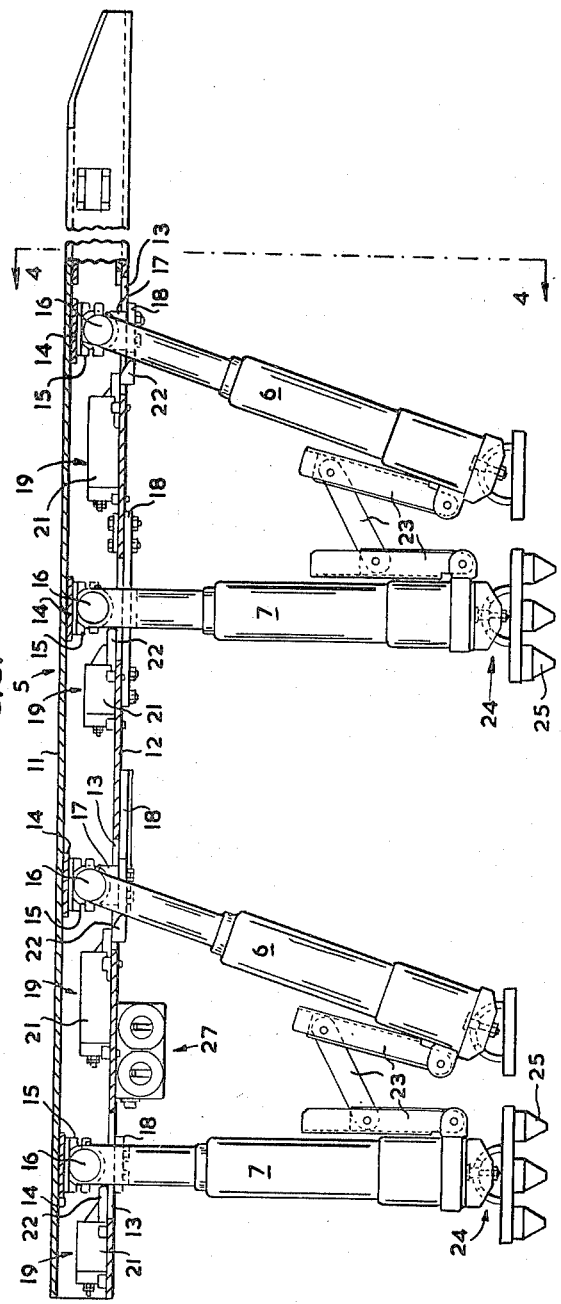

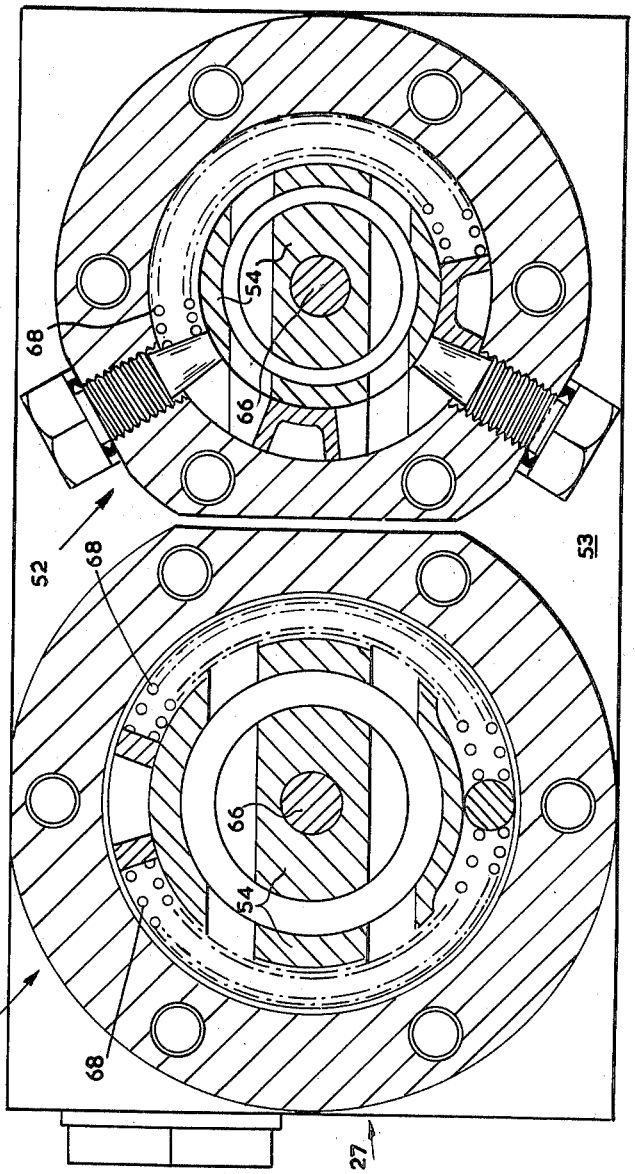

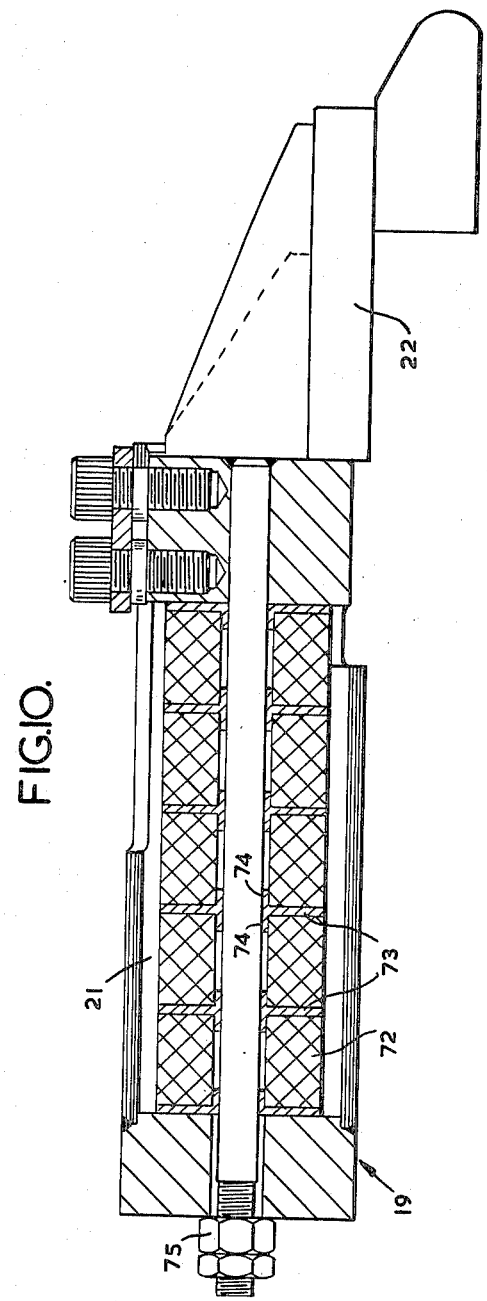

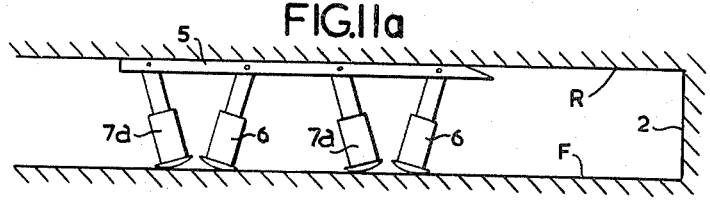
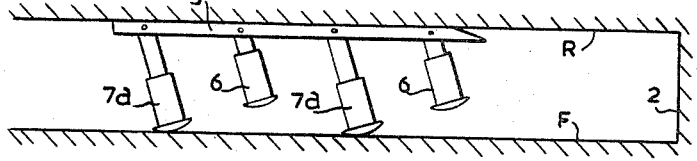
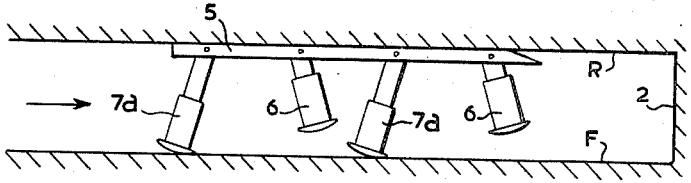
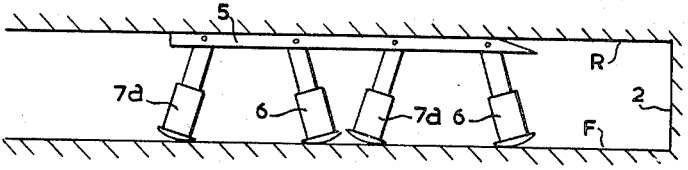
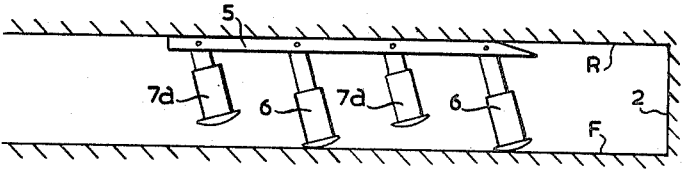
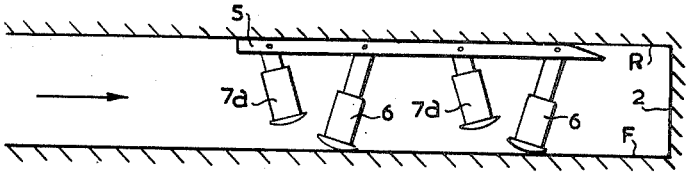
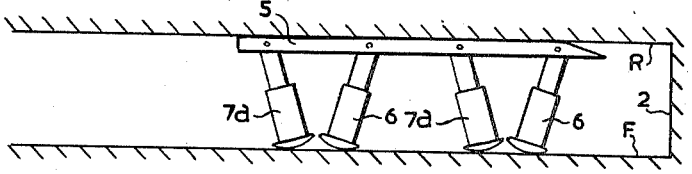

United States Patent Office 3,240,022
Patented Mar. 15, 1966

3,240,022
ROOF SUPPORTS
Joseph Alexander Wallace Mills, Cheltenham, and Richard Henry Bryan Winder, Prestbury, England, assignors to Dowty Mining Equipment Limited, Ashchurch, near Tewkesbury, England, a British company
Filed Sept. 25, 1962, Ser. No. 226,103
Claims priority, application Great Britain, Oct. 2, 1961, 35,517/61; Oct. 19, 1961, 35,564/61; Dec. 27, 1961, 46,296/61
3 Claims. (Cl. 61—45)

This invention relates to roof supports suitable for supporting the roof of a mine, not only when such roof support is set in a fixed or stationary position, but also, and quite importantly, while it is advancing to a new position wherein it is to be set. Each roof support at all times is set in load-bearing condition intermediate the floor and roof, and is advanced in this set load-bearing condition, hence the roof is at all times fully supported at all points, and need never be relieved of part of its support in order to effect advance of any roof support to a new position. In this respect the present invention differs broadly from any mine roof support known to us, all of which effect advance of a given roof support only after that given roof support has quite fully been relieved of its load, and in the unloaded condition is advanced by reaction from another roof support that remains set in load-bearing condition. It follows that this other roof support bears a double load during advance of the temporarily non-load-bearing advancing support, and must be of sufficient capacity that it is not overloaded while it is the only local support for the load, hence must be heavier and stronger than it need be if it always shares the load with one or more adjacent roof supports.

In the forms of the invention illustrated herein, a series of roof supports is distributed, in conventional manner, along the working face of a mine. Each roof support includes one and preferably at least two support members such as generally upright hydraulic props of known construction, ranged one behind another in the direction of advance, and both connected, preferably pivotably at their one end to a member that is shown as engaging the roof, but since it might alternatively engage the floor, will hereinafter be referred to in the broad sense as a "surface-engageable member." The opposite end of at least one such prop, that end which in the illustrated forms would engage the floor, is arranged to rock upon the floor; the campanion prop may remain upright according to one illustrated form, or in another form it too may rock upon the floor, as one stage of the advance is taking place. By reason of such rocking, each prop that rocks during an advance remains set between the roof and the floor and continues to bear its full share of the load while the roof-engageable member is advancing, sliding with respect to the roof. Advance is effected by reaction upon the roof-engageable member from a second roof support alongside (or two such supports at its opposite sides) that remains in set position, and anchors the advance of the second roof support.

One surface-engageable member has been referred to above, and normally only one would be employed, yet the broad principles of this invention would be employed if two surface-engageable members were employed, one engaging the roof and the other the floor, both associated with a given roof support or supports.

The invention is embodied in two illustrative forms in the accompanying drawings, and other forms have been suggested above. A single type will be described herein, one wherein the surface-engageable member engages the roof, yet the type wherein it is arranged to engage the floor will be incorporated by reference to the type specifically described.

Figure 4:
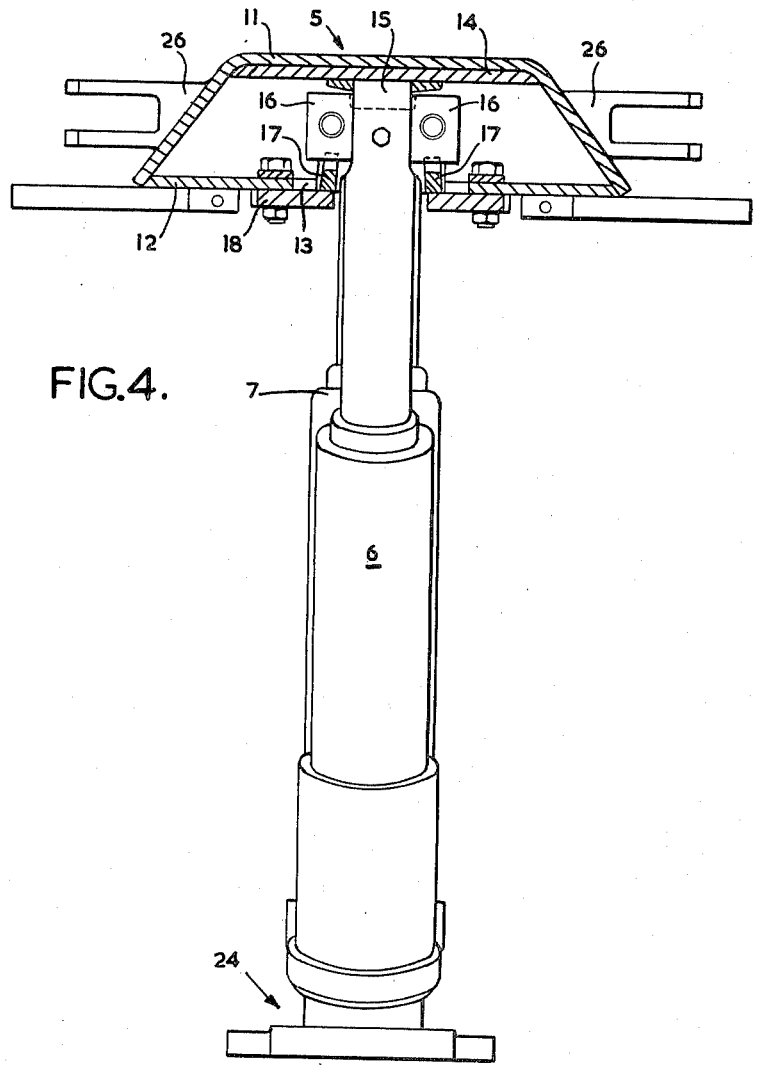
Figure 5:
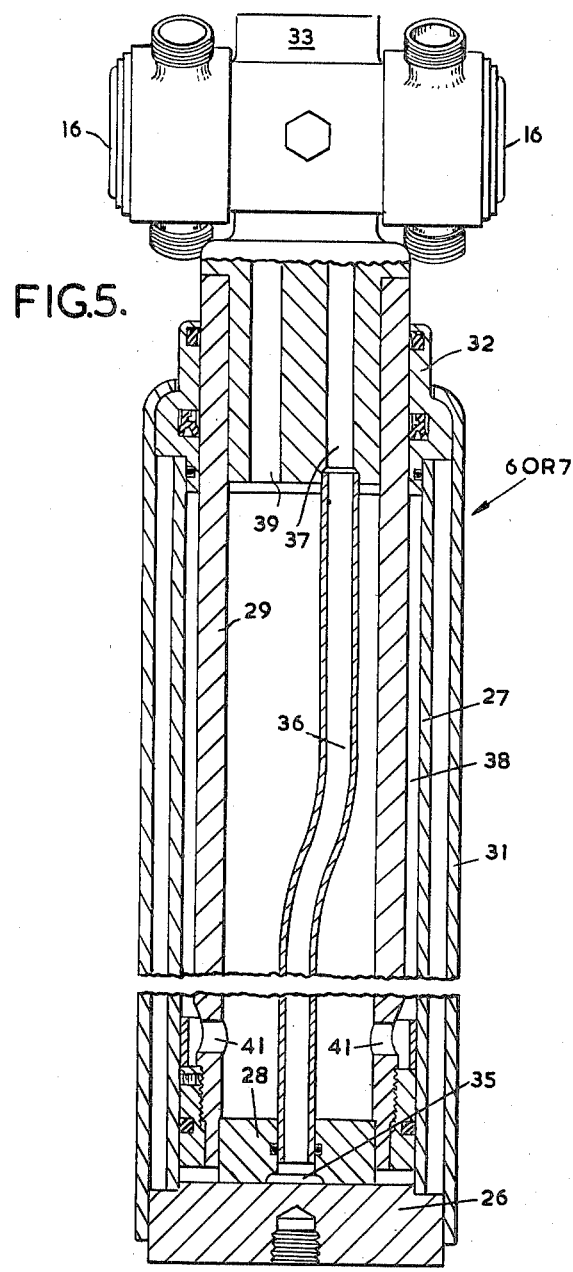
Figure 6:
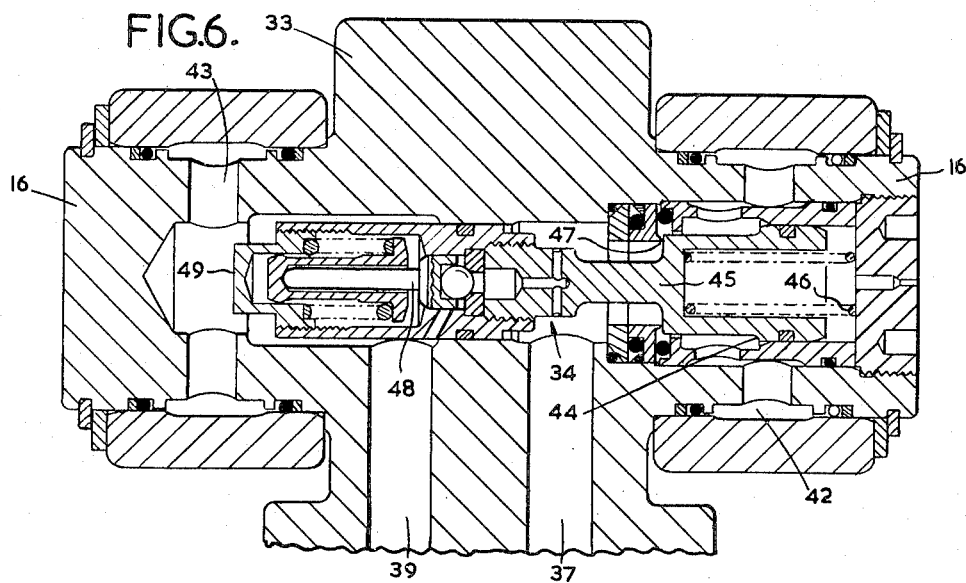
Figure 7:
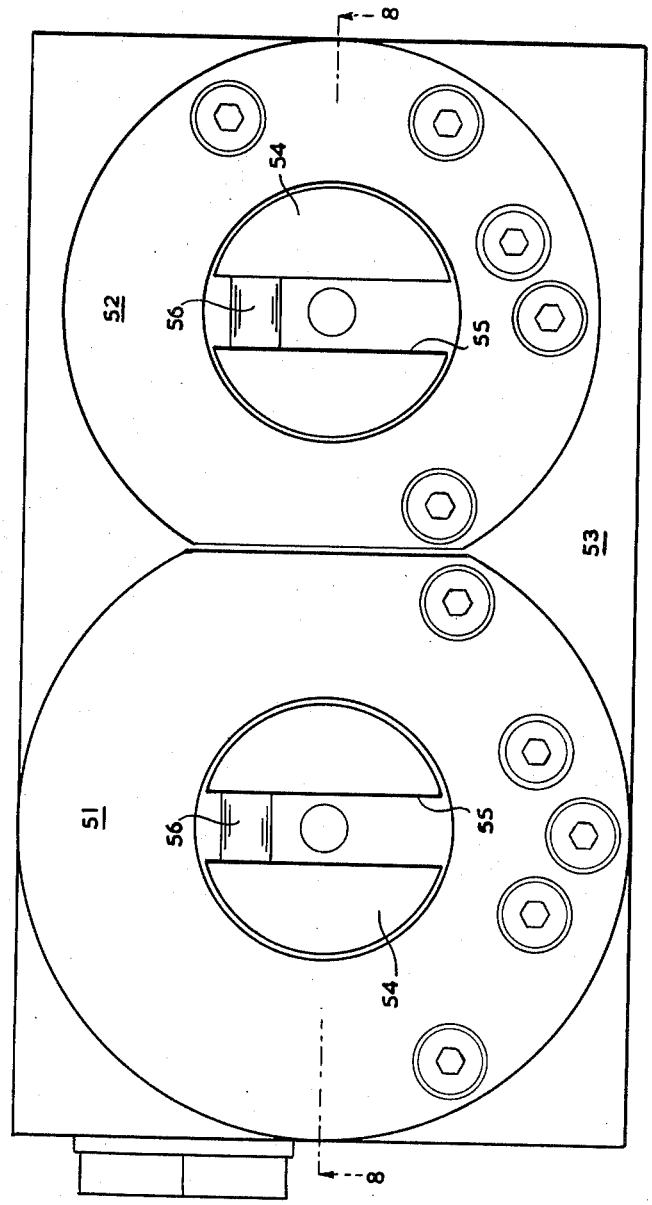
Figure 8:
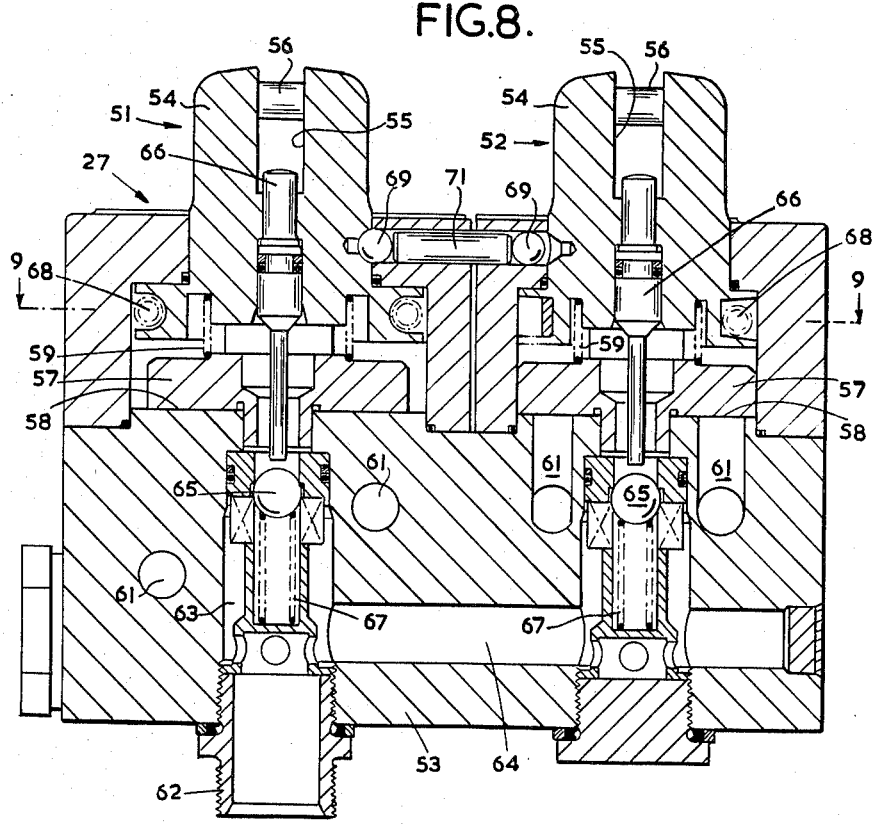

FIGURE 1 shows a diagrammatic plan view of a series of roof supports according to one embodiment in a mine,
FIGURE 2 shows a diagrammatic side view of one of the roof supports in the various attitudes it adopts in the course of an advance,
FIGURE 3 shows a sectional side view of the roof support,
FIGURE 4 is a sectional view along the line 4—4 of FIGURE 3,
FIGURE 5 is a sectional view of one of the props of the roof support,
FIGURE 6 is an enlarged sectional view of the prop showing the valve assembly, the section being taken generally at the same plane as FIGURE 5, but enlarged,
FIGURE 7 is a side view of the control valve of the roof support,
FIGURE 8 is a sectional view of the control valve along the line 8—8 of FIGURE 7,
FIGURE 9 is a sectional view of the control valve along the line 9—9 of FIGURE 8,
FIGURE 10 is a sectional side view of one of the spring assemblies of the roof support and,
FIGURE 11 shows diagrammatic side views of a roof support according to a second embodiment showing the various attitude it adopts during an advance.

With reference to the accompanying drawings, FIGURES 1–10 are concerned with roof supports according to the first embodiment. FIGURES 1 and 2 show the principle of operation of the roof supports and FIGURES 3–10 show the construction of one of the roof supports. Therefore, the principle of operation will first be described with reference to FIGURES 1 and 2 and then the construction of one of the roof supports will be described with reference to FIGURES 3–10.

FIGURE 1 shows a series of roof supports 1 adjacent the working face 2 of a mine, which has a roof R and a floor F. A cutting machine 3 is travelling from right to left and as it operates it is necessary to advance the roof support 1 toward the working face 2. A conveyer 4 is located between the series of roof supports 1 and the working face 2. The conveyor 4 may be advanced by any suitable means and a device for advancing the conveyor 4 will be described later.

Each roof support 1 includes a roof-engageable member in the form of a roof beam 5, two fluid-operated double-acting props 6 pivotally secured at their upper ends to the roof beam 5 and two fluid-operated double-acting props 7 also pivotally secured at their upper ends to the roof beam 5. The lower ends of the props 6 and 7 rest on the floor except that during advance of the roof support, props 6 or props 7 are lifted from the floor, but never the two types of prop simultaneously. The roof beams 5 of adjacent roof supports are connected together by fluid-operated double-acting advancing jacks 8. The props 6 and 7 are arranged alternately one behind the other with one of the props 6 leading. The props 6 and 7 and the advancing jacks 8 are connected to a hydraulic pressure line and a hydraulic return line and each roof support has a control valve for controlling the supply of hydraulic fluid to and from the props 6 and 7 and the jacks 8. The control valve and associated hydraulic circuit will be described later. For the moment, it will suffice to say that, by operating the control valve, the two jacks connected to a roof beam can either be extended or contracted depending upon the position of the roof support in the series (see FIGURE 1), the props 6 can be extended or contracted alternatively.

Figure 2B:
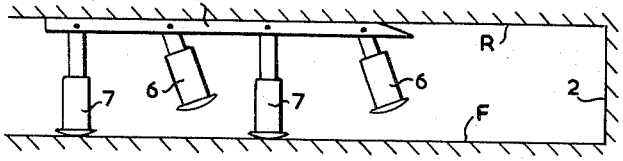
Figure 2C:
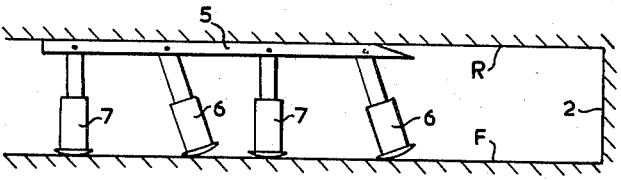
Figure 2D:
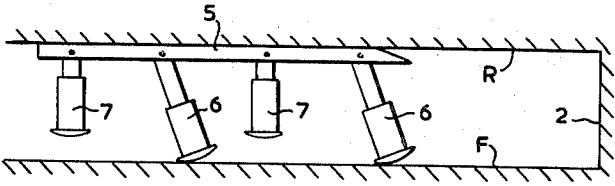

FIGURE 2(a) shows a roof support 1 in the attitude it adopts when it is not being advanced. All four props 6 and 7 are urging the roof beam 5 against the roof by reaction from the floor, the two props 6 being inclined rearwardly and downwardly relative to the roof beam 5 and the two props 7 being perpendicular to the roof beam 5. This was the position of the props at the conclusion of a previous advance. FIGURE 2(b) shows the first stage of an advancing operation. The two inclined props 6 have been contracted so that their lower ends leave the floor and the two props 6 have swung forwardly beyond a position in which they are perpendicular to the roof beam 5 so that they are now inclined forwardly and downwardly relative to the roof beam 5. The two props 6 are then extended so as to assist in forcing the roof beam 5 against the roof, as shown in FIGURE 2(c). The two props 7 are then contracted so that their lower ends are raised above the floor as shown in FIGURE 2(d).

Figure 2E:
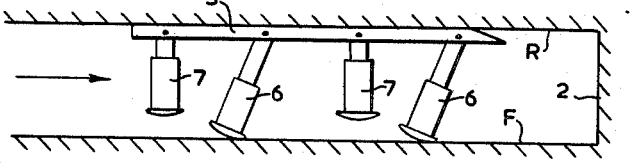
Figure 2F:
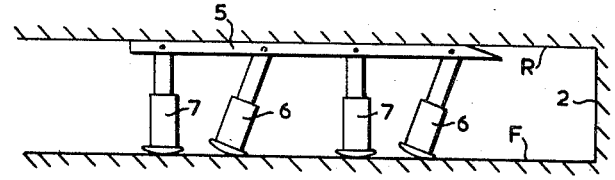

The two advancing jacks 8 connected to the roof beam 5 are then extended or contracted so as to force the roof beam 5 to move forwardly relative to the adjacent roof supports by sliding along the roof with the props 6 rocking on their lower ends until they have rocked to a position in which they are again rearwardly and downwardly inclined relative to the roof beam 5, as shown in FIGURE 2(e). The two props 7 are then extended and the roof support is then in the attitude shown in FIGURE 2(f) which is the same attitude as in FIGURE 2(a). Thus the advancing operation has been completed.

It will be seen that the roof beam 5 is supporting the roof the whole time even while it is being advanced. Normally, the roof support is in the attitude shown in FIGURE 1 and all four props 6 and 7 are forcing the roof beam 5 against the roof. When an advancing operation is being carried out, the roof beam 5 is forced against the roof by either the two props 6 or the two props 7 when the props 7 or the props 6 respectively are contracted.

A roof support will now be described in detail. Referring first to FIGURES 3 and 4, the roof beam 5 of the roof support has a trapezoidal cross-section with the narrower parallel side 11 uppermost, this narrower side 11 thus being the part of the roof beam 5 which engages the roof. The lower and wider parallel side 12 has four apertures 13, one for each prop 6, 7. Opposite each aperture 13, the inner face of the upper side 11 has a strengthening plate 14 welded thereto and to which is welded a concave bearing member 15 for receiving the upper convex end of the prop 6 or 7. Each prop 6, 7 has a pair of laterally projecting stub-shafts 16 at its upper end and these stub-shafts 16 can rest in two concave carrying members 17 which are secured to the lower side 12 of the roof beam 5 so that they project into an aperture 13. When a prop is in a roof supporting condition, the upper end of the prop bears against the bearing member 15 and the stub-shafts 16 are spaced from the carrying members 17. When a prop is contracted so that its lower end rises clear of the ground, its stub-shafts 16 rest in the carrying members 17. This arrangement allows a small amount of movement of each prop relative to and transversely of the length of the roof beam 5. The carrying members 17 are supported by members 18 which are secured to the outside of the lower side 12 of the roof beam 5, as by bolting or welding.

A spring assembly 19 (shown in detail in FIGURE 10) is provided for each prop 6, 7 and is located inside the roof beam 5. Each spring assembly 19 includes a housing 21 secured to the inside of the lower side 12 of the roof beam 5 and a plunger 22 which abuts the prop associated with it. Each spring assembly 19 associated with the rocking prop 6 is arranged so that the plunger 22 reaches the limit of its movement out of the housing 21 when the prop 7 is in the forwardly inclined position. During an advance of the roof beam 5 when the props 6 rock from the forwardly inclined position to the rearwardly inclined position, the plunger 22 is forced back into the housing, storing energy in a rubber spring in the housing. After an advance of the roof beam 5, each prop 6 is contracted so that its lower end rises clear of the floor and the spring assembly 19 springs the prop 6 forwardly. The construction of each spring assembly 19 will be described later with reference to FIGURE 10.

In order to prevent each prop 6 from skidding forwardly when it is in a roof supporting condition, the lower end portion of each prop 6 is connected to the prop 7 which lies to the rear of the prop 6 by a connection formed by three hinged links 23. When each prop 6 is in its rearwardly inclined position, the links 23 fold up (as shown in FIGURE 3) so that they are clear of the floor, and when each prop 6 swings forwardly, the links 23 form a straight linkage and limit forward movement of the prop 6.

Each spring assembly 19 associated with each prop 7 is arranged so that the plunger 22 reaches the limit of its movement out of the housing 21 when the prop 7 is perpendicular to the roof beam 5. Although the props 7 do not rock during an advance of the roof beam 5, they are preferably pivotally connected to the roof beam 5 so as to allow for any movement of the roof relative to the floor of the mine. It will be seen that, when the roof support is set in the attitude shown in FIGURE 3, this being the attitude in which it remains when the support is not being advanced, each prop 6, 7 can pivot about the roof beam 5 if movement of the roof relative to the floor occurs. If such relative movement occurs, the props 6 and 7 will be brought back to their correct position relative to the roof beam 5 during the next advancing operation. Thus each spring assembly 19 associated with a prop 7 will return prop 7 to the perpendicular position when the prop 7 is contracted.

A swivelling attachment 24 is secured to the foot of each prop 6, 7 and these attachments 24 may be provided with claws 25 which prevent the foot of the prop from sliding along the floor.

A lug 26 is secured to each of the non-parallel sides of the roof beam 5 to form an attachment point for an advancing jack 8.

A control valve 27 (see FIGURES 7, 8 and 9) is secured to the under-side of the roof beam 5 between the rear props 6, 7. The control valve 27 is connected to a power unit by hydraulic supply and return lines and hydraulic lines extend from the control valve 27 to the props 6, props 7 and the advancing jacks 8. So as not to render the drawings unduly complicated, these hydraulic lines have been omitted. The contruction of the control valve 27 will be described later with reference to FIGURES 7–9.

Each prop 6, 7 is constructed in a similar manner and one of these props is shown in FIGURES 5 and 6, the foot attachment 24 being omitted. The props 6 or 7 includes a base 20 to which is secured the lower end of a cylinder 27 in which slides a piston assembly 28 carried by a cylinder 29. The lower end of a guard cylinder 31 which surrounds the cylinder 27 is secured to the base 20 and the upper ends of the cylinder 27 and guard cylinder 31 are secured to a guide ring 32 in which the cylinder 29 slides. The upper end of the cylinder 29 is closed by a closure member 33 with which the stub-shafts 16 are integral. A valve assembly 34 is located within the closure member 33 and is inserted into the member 33 through one of the stub-shafts 16. The valve assembly 34 communicates with a pressure chamber 33 which is located between the piston assembly 28 and the base 20 through a pipe 36 and conduit 37, and communicates with an annular space 38 between the cylinders 29 and 27 and above the piston assembly 28 through conduit 39, the inside of cylinder 29 and aperture 41 in the wall of the cylinder 29.

The hydraulic line from the control valve 27 is connected to a chamber 42 in the right hand stub-shaft 16 by means of a spigot secured to the stub-shaft and another hydraulic line is connected between the control valve 27 and a chamber 43 in the left hand stub-shaft 16 by means of a spigot secured to the stub-shaft 16. Referring especially to FIGURE 6, when hydraulic pressure from the control valve 27 is applied to the chamber 42, this pressure will act upon an annular surface 44 of a valve member 45 to move the valve member 45 against a spring 46 so that the valve member 45 leaves a valve seat 47. Hydraulic fluid then passes from chamber 42 along conduit 37 and pipe 36 to pressure chamber 35 and extends the prop. While hydraulic pressure is connected to chamber 42, chamber 43 is connected to the return line by the control valve, wherefore annular space 38 is vented by way of conduit 39. When the prop has been extended chamber 42 is also connected to the return line through a restrictor in the control valve (as will be explained more fully in the description of the control valve), and the valve member 45 is urged against the seat 47 by the spring 46 so that fluid is trapped in the pressure chamber 35.

If the pressure in chamber 35 becomes excessive, a pressure relief valve 48 opens to afford communication with conduit 37 and discharges fluid into chamber 43.

To release the prop, hydraulic pressure is applied by the control valve 27 to chamber 43. This pressure acts upon an end face 49 of the valve member 45 and forces the valve member 45 off the seat 47, thus releasing fluid from the pressure chamber 35 which flows up the pipe 36 and conduit 37 to the chamber 42 and thence to return. At the same time the pressure in chamber 43 is communicated through the conduit 39, cylinder 29 and apertures 41 to the space 38 where it acts between the guide rings 32 and the upper side of the piston assembly 28 to contract the prop.

Thus, normally the two chambers 42, 43 are connected by the control valve 27 to the return line. When the prop is to be released, chamber 43 is connected to the pressure line and when the prop is to be set, chamber 42 is connected to the pressure line.

The control valve is shown in FIGURES 7–9, and is actually two control valve units 51, 52 connected together in a housing 53. The left hand unit 51 controls the props 6 and the advancing jacks 8 and the right hand unit 52 controls the props 7. Each unit 51, 52 includes a rotary actuating member 54 which can be rotated by a handle (not shown) which is insertable into a slot 55 and under a bridge 56 in the actuating member 54. Each actuating member 54 rotates a selector 57 which engages a face 58 in the housing 53. A spring 59 acting between the actuating member 54 and the selector 57 urges the selector 57 against the face 58. The various connections to the props 6, 7, the jacks 8 and the hydraulic return line communicate with conduits 61 in the housing 53, which conduits 61 open onto the face 58. The selector 57 has suitable apertures which communicate or do not communicate with the conduits 61, according to the position of the selector 57. The hydraulic pressure line is connected to a spigot 62 and passes through conduit 63, 64 in the housing 53 to the units 51, 52 respectively. Each unit 51, 52 has a ball valve 65 preventing the hydraulic pressure from reaching the selector 57. A linearly moveable actuator 66 passes through the rotary actuating member 54 and the selector 57 to a position adjacent the ball valve 65. When the operating handle is located in the slot 55 and under the bridge 56, pivotal movement of the handle about the bridge 56 forces the actuator 66 to open the ball valve 65 against the action of a spring 67.

Thus in operation, the handle is used to rotate the selector 57 to the required position and is then used to open the ball valve 65 to allow hydraulic pressure to be applied to the required prop or jack and also to allow the required prop or jack to be brought into communication with the return line. When the handle is released, the spring 67 closes the ball valve 65 and spring 68, reacting between the housing 53 and the rotary actuating member 54, returns the selector 57 to a neutral position. Any hydrualic pressure left on the downstream side of the ball valve 65 leaks away to the return through a restricted orifice in the selector 57.

A mechanical interlock formed by two balls 69 and a rod 71 prevents both props 6 and 7 from being released at the same time.

FIGURE 10 shows one of the spring assemblies 19. The energy storing means is formed by a series of rubber rings 72, over compression of which is prevented by metal rings 73 with feet 74. The maximum movement of plunger 22 out of the housing 21 can be adjusted by a nut 75.

Instead of the spring assembly 19, each prop could be carried by spring surrounding the stub-shafts 16, the natural state of the springs being arranged to occur when the prop is at the correct angular position relative to the roof beam 5. Pivotal movement of the prop relative to the beam 5 from this position would twist the springs, thus storing energy in them. Ropes secured to the roof bar 5 could be provided to limit the movement of the prop away from the roof beam 5 when the prop is contracted. Alternatively, a spring located in the roof beam and arranged to act on the prop could be associated with a stop plate, so that when the prop was in the desired angular position the stop plate prevents the spring from acting on the prop.

In the embodiment described with reference to FIGURES 1–10 each advancing operation, that is the cycle of operations beginning with the support in one attitude and continuing until the same attitude is reached again, includes only one sliding movement of the roof beam 5. It is also within the scope of the invention to construct a roof support in such a manner that each advancing operation includes more than one sliding movement of the roof beam 5. For example, FIGURE 11 shows a roof support which undergoes an advancing operation having two sliding movements of the roof beam 5. This roof support has the two props 6 pivotally secured at their upper ends to the roof beam 5 and has another two props 7a also pivotally secured at their upper ends to the roof beam 5.

The normal attitude of the roof support is that shown in FIGURE 11(a) in which the two props 6 are rearwardly and downwardly inclined relative to the roof beam 5 and the two props 7a are forwardly and downwardly inclined relative to the roof beam 5. The props 6 and 7a are arranged alternatively one behind the other with a prop 6 leading. The lower ends of the props 6 and 7a rest on the floor. In an advancing operation, the props 6 are first contracted and swung to the forwardly inclined position as shown in FIGURE 11(b). The jacks connected to the roof beam 5 are then operated, for example contracted, to force the roof beam 5 to slide along the roof with the two props 7a rocking about their lower ends and constantly forcing the roof beam 5 against the roof, as shown in FIGURE 11(c). Props 6 are then extended so that they assume a roof supporting condition (FIGURE 11(d)) and the props 7a are contracted and rocked forwardly to their original forwardly inclined position (FIGURE 11(e)).

The two roof supports on opposite sides of this roof support must then go through a similar operation so that the jacks connected to this roof support become contracted. The jacks are then extended once again and this time the roof beam 5 slides along the roof with the two props 6 rocking about their lower ends and constantly supporting the roof, as shown in FIGURE 11(f). The props 7a are then extended so that the roof support assumes the attitude shown in FIGURE 11(g) which is the same attitude as in FIGURE 11(a). Thus the advancing operation has been completed with two moves of the roof beam 5.

In the two described embodiments, the props are located one behind the other. It is also possible to locate one or more props laterally of another prop so that during an advancing operation, these props overlap or, in other words, appear in a crossing position when the roof support is viewed from the side.

Since the roof beam 5 is not lowered from the roof during an advance, it always remains at a substantially constant height above the floor and hence any necessary equipment, for example stowing pipes, hydraulic lines, a winning machine or a conveyor, could be suspended from the roof bar. Also, the leading end of the roof beam could be shaped as a cutting edge or the roof beam could carry a cutting device.

Two or more of the roof supports could be linked together by members which support the roof between the roof supports. This is useful if it is desired to use a cutting machine between the roof supports, for example in short wall mining.

Although the conveyor may be advanced by any suitable means, one convenient way is to use a T-shaped advancing device which is connected to the conveyor but not connected to the roof supports. The trunk of the T-shape contains an advancing jack and the foot of the trunk is connected to the conveyor. The device is positioned in front of two roof supports so that the arms of the T-shape each abut one prop of each roof support. When the jack is extended, the props act as an abutment for the device and the conveyor is pushed forwardly. The jack can be then contracted to pull the arms of the T-shape forwardly so that they are not fouled by the props of the roof supports when the roof supports advance.

The surface engageable member obviously may engage either the roof R, as shown, or the floor F. It may be coated with a friction reducing agent, for example molybdenum disulphide, or may be lubricated by water or other lubricant, for example the hydraulic fluid used to operate the props and advancing jacks. Also, means may be provided for preventing the surface engageable member from moving backwards, for example a claw or ratchet device which is forced into the surface if the member has a tendency to be forced backwards, may be secured to the surface-engageable member.

According to another embodiment of the invention, a roof support advances by rocking on two non-parallel props arranged so that, at the commencement of the advance of a surface-engageable member, one prop is inclined forwardly relative to the surface-engageable member and the other prop is perpendicular or inclined rearwardly relative to the surface-engageable member. The said one prop may be forwardly inclined relative to or perpendicular to the surface-engageable member at the end of the advance of the surface-engageable member. The ends of the two props remote from the surface-engageable member may be connected in such a manner that the distance between these two ends is constant.

We claim as our invention:

1. A roof support for use in mines, comprising a series of at least first and second roof beams of which a first beam is slidable forwardly while in supporting contact with the roof, a first pair of extensible and contractible support members disposed one ahead and one behind in the direction of advance of said beam, each pivotally engaged at its upper end with said first beam, and in an initial supporting position inclined downwardly and rearwardly from said first beam to contact the floor and to uphold said first beam and the roof, a second pair of extensible and contractible support members extending between said first beam and the floor, to support said first beam when the first pair of support members is contracted, means reacting between said first beam and a temporarily fixedly positioned second beam to advance said first beam, and thereby to rock said first support members, while extended in their supporting position, relative to the first beam and to the floor, into their initial supporting position, energy-storing means reacting between the first beam and said first support members, and energized by such rocking movement of the first support members into their initial supporting position, to swing said first support members into such initial supporting position upon their contraction from contact with the floor following an advance of the first beam, and means to contract said second support members from contact with the floor prior to advance of the first beam and consequent rocking of the first support members.

2. A roof support for use in mines, comprising a series of roof beams of which a first beam is slidable forwardly while in supporting contact with the roof, a first pair of extensible and contractible support members disposed one ahead and one behind in the direction of advance of said first beam, and a like second pair of extensible and contractible support members, all said support members being pivotally engaged at their upper ends with said first beam, and the first pair support members in their initial supporting position being inclined downwardly and rearwardly from the beam to contact the floor and to uphold the beam and the roof, the second pair of support members at such time being inclined downwardly and forwardly from the beam to contact the floor, and to uphold the beam and the roof when the first pair is contracted, means reacting between the first beam and a temporarily fixedly positioned second beam to advance said first beam while it is supported by either pair of support members, and to rock that pair to its initial supporting position while it is extendede in the supporting position, means to contract the other pair during such porting position while it is extended in the supporting position following such advance, and energy-storing means reacting between the first beam and each pair of support members, and energized by rocking of the supporting pair to its initial supporting position during an advance, to restore the same to its forwardly and downwardly inclined position upon support of the beam upon the other pair, and contraction of the just-rocked pair.

3. A roof support for use in mines, comprising a first beam contacting the roof and slidable forwardly while in such contact, a first pair of extensible and contractible support members initially forwardly and downwardly inclined and disposed one ahead and one behind, in the direction of advance of said beam, and each pivotally engaged at its upper end with said beam, to rock relatively to the same about their respective transverse axes, while extended, to an oppositely inclined position, and by engagement of its lower end with the floor to support said beam and the roof while at rest or during an advance, a second pair of extensible and contractible support members also arranged one ahead and one behind, and each when extended supportingly engaged at its upper end with the beam, and by the engagement of its lower end with the floor serving to support said beam, means reacting from a second beam that is temporarily fixedly positioned to apply an advancing force to the first beam sufficient to advance it from one position to another, and thereby to cause its first support members to rock about their lower ends and relative to the beam at their upper ends, contracting under load as may be necessary for them to reach their oppositely inclined position, means to contract said second pair of support members from beam-supporting condition during rocking of the first pair and consequent advance of the first beam, and to extend said second pair to beam-supporting condition following such advance, and energy-storing means disposed for engagement by the first support members, to be energized by rocking of the latter during an advance, and operable upon said first pair of support members to rock the same relatively to the beam, following their contraction, back into the forwardly and downwardly inclined disposition prior to their extension into beam-supporting condition, preparatory to a further advance of the beam and rocking of the first support members to their oppositely inclined position.

References Cited by the Examiner

UNITED STATES PATENTS

| | | | |
|---|---|---|---|
| 988,948 | 4/1911 | Reinhard | 61—45.1 |
| 2,795,936 | 6/1957 | Blower et al. | 61—45.2 |
| 3,113,661 | 12/1963 | Linke et al. | 61—45.2 |

FOREIGN PATENTS

| | | |
|---|---|---|
| 565,918 | 4/1958 | Belgium. |
| 1,264,673 | 5/1961 | France. |
| 815,956 | 7/1949 | Germany. |
| 773,407 | 4/1957 | Great Britain. |
| 830,342 | 3/1960 | Great Britain. |
| 858,633 | 1/1961 | Great Britain. |
| 870,486 | 6/1961 | Great Britain. |

CHARLES E. O'CONNELL, *Primary Examiner.*

EARL J. WITMER, *Examiner.*

R. A. STENZEL, *Assistant Examiner.*